United States Patent
Fuller et al.

(10) Patent No.: US 9,342,060 B2
(45) Date of Patent: May 17, 2016

(54) ADAPTIVE CONTROL FOR A GAS TURBINE ENGINE

(75) Inventors: James W. Fuller, Amston, CT (US); Ramesh Rajagopalan, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 584 days.

(21) Appl. No.: 12/881,846

(22) Filed: Sep. 14, 2010

(65) Prior Publication Data

US 2012/0060505 A1 Mar. 15, 2012

(51) Int. Cl.
G05B 13/02 (2006.01)
G05B 13/00 (2006.01)
G05B 13/04 (2006.01)

(52) U.S. Cl.
CPC .............. *G05B 13/00* (2013.01); *G05B 13/048* (2013.01)

(58) Field of Classification Search
USPC .......................................................... 700/29
See application file for complete search history.

(56) References Cited

U.S. PATENT DOCUMENTS

| | | | |
|---|---|---|---|
| 4,411,595 A * | 10/1983 | Pisano | 416/1 |
| 4,745,553 A * | 5/1988 | Raven et al. | 701/104 |
| 6,338,240 B1 | 1/2002 | Endo et al. | |
| 6,442,928 B1 | 9/2002 | Endo et al. | |
| 6,523,433 B1 | 2/2003 | Staker | |
| 6,567,709 B1 | 5/2003 | Malm et al. | |
| 6,625,987 B2 | 9/2003 | Pisano et al. | |
| 6,823,253 B2 | 11/2004 | Brunell | |
| 6,823,675 B2 | 11/2004 | Brunell et al. | |
| 6,860,712 B2 | 3/2005 | Pisano et al. | |
| 7,216,071 B2 | 5/2007 | Volponi | |
| 7,277,838 B2 | 10/2007 | Volponi et al. | |
| 7,472,100 B2 | 12/2008 | Volponi et al. | |
| 7,627,455 B2 | 12/2009 | Lenz et al. | |
| 8,300,749 B2 * | 10/2012 | Hadzic et al. | 375/354 |
| 2004/0102890 A1 | 5/2004 | Brunell | |
| 2004/0123600 A1 | 7/2004 | Brunell et al. | |
| 2004/0179672 A1 * | 9/2004 | Pagel et al. | 379/266.1 |
| 2007/0073525 A1 * | 3/2007 | Healy et al. | 703/7 |
| 2009/0281640 A1 | 11/2009 | Fuller | |
| 2009/0281641 A1 | 11/2009 | Fuller | |
| 2010/0010645 A1 | 1/2010 | Fuller | |

OTHER PUBLICATIONS

Wan et al., "Efficient robust constrained model predictive control with a time varying terminal constraint set", Elsevier Science 2002.*

(Continued)

*Primary Examiner* — Carlos Ortiz Rodriguez
(74) *Attorney, Agent, or Firm* — O'Shea Getz P.C.

(57) ABSTRACT

A method for controlling a gas turbine engine includes: generating model parameter data as a function of prediction error data, which model parameter data includes at least one model parameter that accounts for off-nominal operation of the engine; at least partially compensating an on-board model for the prediction error data using the model parameter data; generating model term data using the on-board model, wherein the on-board model includes at least one model term that accounts for the off-nominal operation of the engine; respectively updating one or more model parameters and one or more model terms of a model-based control algorithm with the model parameter data and model term data; and generating one or more effector signals using the model-based control algorithm.

23 Claims, 5 Drawing Sheets (56) References Cited

OTHER PUBLICATIONS

Michini et al "Adaptive Control for Indoor Autonomous Vehicles: Design Process and Flight Testing", American Institute of Aeronautics and Astronautics, Aug. 2009, http://acl.mit.edu/papers/L1GNC09.pdf.

Wiseman, Matthew. "Intelligent Engine Systems: Work Element 1.2: Malfunction and Operator Error Reduction", Oct. 2005, NASA/CR-2005-213964, http://gltrs.grc.nasa.gov.

EP search report for EP11250795.9 dated Feb. 2, 2015.

* cited by examiner

ADAPTIVE CONTROL FOR A GAS TURBINE ENGINE

BACKGROUND OF THE INVENTION

1. Technical Field

This disclosure relates generally to adaptive control for a gas turbine engine and, more particularly, to adaptive control that at least partially compensates for off-nominal engine operation.

2. Background Information

Generally, a control algorithm for a gas turbine engine uses an on-board model of dynamics of the engine during nominal operation. A control law using the on-board model may include certain performance margins to accommodate slight dynamic variations associated with manufacturing tolerances, normal wear, and normal environmental conditions.

Some advanced control algorithms include fault detection schemes that compensate for more significant dynamic variations. One example of such a fault detection scheme requires the control algorithm to detect a fault, isolate the fault, and identify the fault before compensating for the fault. In order to detect the fault, one or more measured parameters must be greater than a predetermined threshold. Selection of such a threshold can be difficult, however, due to the inherent compromises between fault detection and fault accommodation. For example, while greater threshold levels can produce fewer false positives, more faults remain undetected and, thus, uncompensated. In contrast, while lower thresholds increase fault detection and compensation, the rate of false positives also increases.

There is a need in the art, therefore, for a continuously adaptive control system operable to control a gas turbine engine during both nominal and off-nominal operation conditions, without requiring fault detection, isolation and/or identification.

SUMMARY OF THE DISCLOSURE

According to a first aspect of the invention, a method is provided for adaptively controlling a gas turbine engine. The method includes the steps of (a) generating model parameter data as a function of prediction error data, which model parameter data includes at least one model parameter that accounts for off-nominal operation of the engine; (b) at least partially compensating an on-board model for the prediction error data using the model parameter data; (c) generating model term data using the on-board model, wherein the on-board model includes at least one model term that accounts for the off-nominal operation of the engine; (d) respectively updating one or more model parameters and one or more model terms of a model-based control algorithm with the model parameter data and model term data; and (e) generating one or more effector signals using the model-based control algorithm.

According to a second aspect of the invention, a system is provided for adaptively controlling a gas turbine engine. The system includes a control module, a comparator, an estimator and a modeling module. The control module is adapted to generate one or more effector signals using a model-based control algorithm in response to receiving one or more control signals. As the engine model is modified, the effector signals are changed to better accommodate the off-nominal situation. The control module is further adapted to respectively update at least one model parameter and at least one model term of the model-based control algorithm using model parameter data and model term data. The comparator is adapted to provide prediction error data by comparing measured engine data to predicted engine data. The estimator is adapted to generate the model parameter data in response to receiving the prediction error data, wherein the model parameter data includes at least one model parameter that accounts for off-nominal operation of the engine. The modeling module is adapted to generate the predicted engine data and the model term data using an on-board model. The modeling module is further adapted to update the on-board model with the model parameter data to at least partially compensate for the prediction error data. The on-board model includes at least one model term that accounts for off-nominal operation of the engine. Engine control is achieved via substantially continuous and concurrent processes: 1) effector signals are determined that make an onboard model perform as is desired; and 2) model parameters that can represent off nominal behavior are adjusted until the model matches the physical engine. Working together these processes provide effector signals that accommodate the off-nominal situations.

The foregoing features and the operation of the invention will become more apparent in light of the following description and the accompanying drawings.

DETAILED DESCRIPTION OF THE INVENTION

The present invention includes a method and apparatus for adaptively controlling a gas turbine engine during both nominal and off-nominal operation. Nominal operation includes, for example, engine operation in an environment that occurs on a relatively routine basis (e.g., clear skies, moderate turbulence, rain, etc.), fully-functional engine operation, or slightly degraded engine operation that occurs on a relatively routine basis (e.g., moderate blade abalation, blade tip/case clearances opening, moderate icing, etc.). Off-nominal (or "subnominal") operation includes, for example, engine operation in a substantially abnormal environment (e.g., an ash cloud, heavy turbulence, sand ingestion, heavy icing, foreign object damage (e.g., from ice, birds, runway debris, etc.), severe meteorological conditions, etc.), or substantially degraded engine operation (e.g., when an internal component/system of the engine 16 has sustained damage such as holes in a combustor or engine case, failure due to fatigue or delayed maintenance, etc.).

Figure 1:
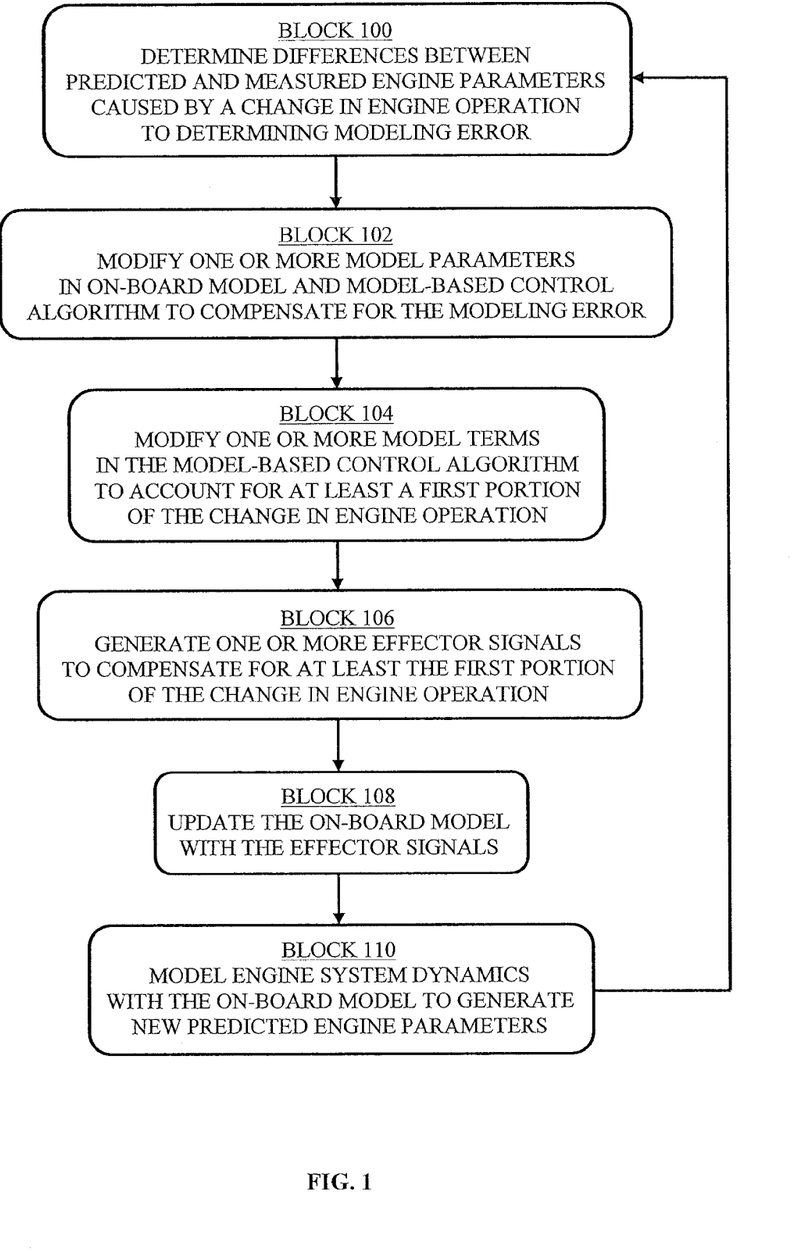
FIG. 1 is a flow diagram that overviews a method for adaptively controlling a gas turbine engine.

The engine is adaptively controlled using a model-based control algorithm, an estimator and an on-board model. The model-based control algorithm, the estimator and the on-board model are each continuously updated to account for real-time changes in operating conditions. Referring to FIG. 1, a change, for example, from nominal to off-nominal operation can create discrepancies (i.e., differences) between one or more engine parameters predicted by the on-board model and the same engine parameters measured by one or more engine sensors (see block 100).

The estimator modifies one or more model parameters in the on-board model and in the model-based control algorithm to at least partially compensate for each of the discrepancies (see block 102). At least one of the model parameters (also referred to as a "tuner", "bias", "disturbance" or "estimate") represents an abnormal environmental condition, engine damage (e.g., a gas flow path leak), engine inefficiency, etc., indicative of the off-nominal operation. The on-board model modifies one or more model terms in the model-based control algorithm to account for at least a first portion of the change from nominal to off-nominal operation (see block 104). At least one of the model terms is designed to model the abnormal environmental condition, engine damage, engine airflow changes, engine inefficiency, etc. One or more of the model terms can be also be designed to model normal engine variations. The first portion of the change represents a sub-change that occurs during one cycle of the control process (e.g., a rise in temperature that occurs during one cycle). In other examples, however, the entire change may occur over a single process cycle.

The term "effector signal" is used herein to refer to a command signal used for controlling operation of an engine actuator (also sometimes referred to as an "effector"). Under the present invention, one or more effector signals are generated using the modified model-based control algorithm that at least partially compensate for the first portion of the change from nominal to off-nominal operation (see block 106). Additional effector signals are then generated that at least partially compensate for subsequent portions (sub-changes) of the change from nominal to off-nominal operation by: (i) updating the on-board model with the effector signals (see block 108), (ii) modeling system dynamics of the engine with the modified on-board model to generate new predicted engine parameters (see block 110), and (iii) repeating the adaptive control process starting with block 100. In this manner, the engine is seamlessly and adaptively controlled to compensate for the change from nominal to off-nominal operation. Examples of each system and component used to perform this method will be described below in further detail.

Figure 2:
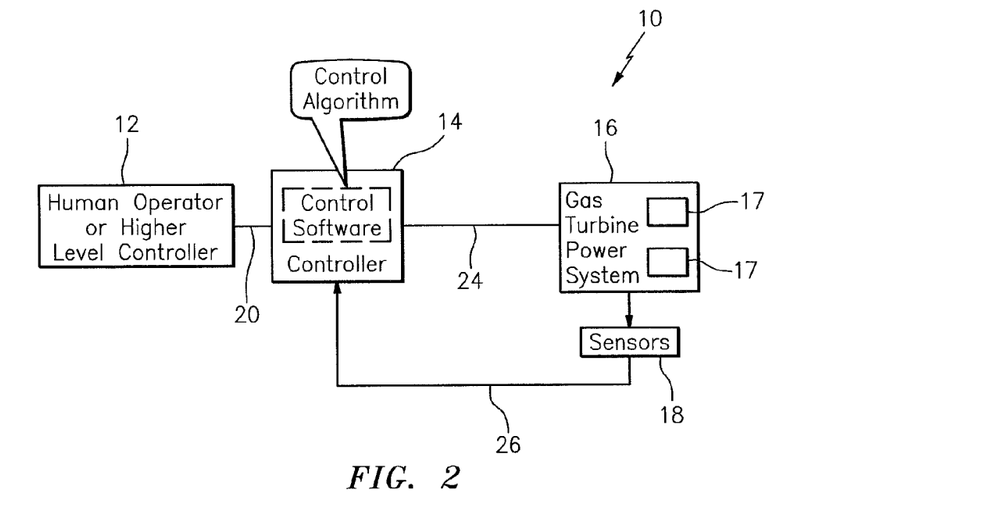
FIG. 2 is a schematic diagram of one embodiment of a gas turbine control system that includes a high level controller, an adaptive control system, a gas turbine engine, and one or more sensors.

Referring to FIG. 2, a gas turbine power system 10 is shown that includes a high level controller 12, an adaptive control system 14, a gas turbine engine ("engine") 16 having one or more actuators 17, and one or more sensors 18. The following is a brief overview of interactions between the aforesaid systems and components of the gas turbine power system 10. The adaptive control system 14 ("control system"), which is configured to perform the adaptive control method set forth above, will be described in further detail thereafter.

Figure 3:
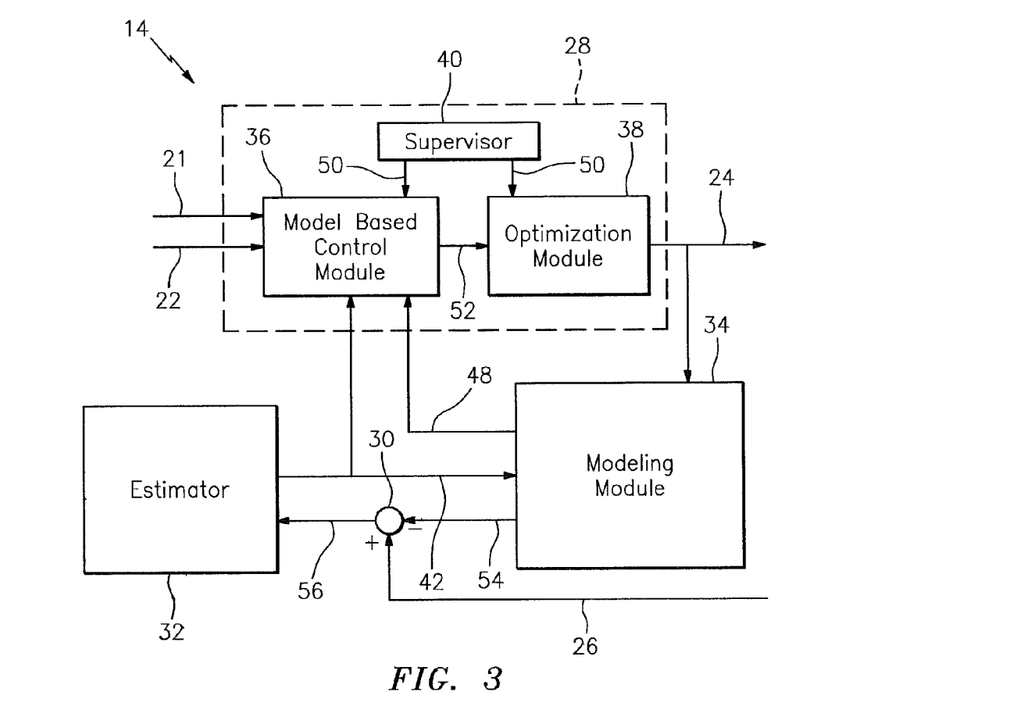
FIG. 3 is a schematic diagram of one embodiment of the adaptive control system shown in FIG. 2.

The high level controller 12 provides one or more control signals 20 to the control system 14. Referring to FIGS. 2 and 3, the control signals 20 can be partitioned to include, for example, one or more goals 21 (also referred to as "command signals") and one or more limits 22 (also referred to as "limit values"). A signal indicative of a command to operate the engine 16 at a certain thrust level is an example of a goal. A signal indicative of a control limit (i.e., a maximum or minimum) to prevent an engine component/system from exceeding a certain temperature is an example of a limit. Referring again to FIG. 2, the control system 14 respectively provides one or more effector signals 24 to the engine actuators 17. The effector signals 24 are generated, as a function of the control signals 20 and one or more sensor output signals 26 (or feedback signals), to control the engine 16 during nominal and off-nominal operation. The sensors 18 monitor certain engine parameters such as temperatures, pressures, speeds, etc. The sensors 18 also provide measured engine data 26, via the sensor output signals, indicative of the monitored engine parameters.

Referring to FIG. 3, an embodiment of the control system 14 is shown that includes a control module 28, a comparator 30, an estimator 32 and a modeling module 34. The control module 28 includes a plurality of sub-modules. The sub-modules include a model-based control module 36, an optimization module 38 and a supervisor module 40. The following is a brief overview of interactions between the aforesaid system elements. Each element will be described in further detail following this overview.

Referring to FIGS. 2 and 3, the model-based control module 36 receives the control signals (e.g., the goals 21 and limits 22) from the high level controller 12, model parameter data 42 from the estimator 32, model term data 48 from the modeling module 34, and supervisor command data 50 from the supervisor module 40. The model-based control module 36 also provides effector equation data 52 to the optimization module 38. The optimization module 38 receives the supervisor command data 50 from the supervisor module 40, and provides the effector signals 24 to the engine 16 and to the modeling module 34. A portion of signal 50 indicates which of the goals 21 and limits 22 are currently enabled (to be tracked or held) and the relative priority of the enabled goals and/or limits. The comparator 30 receives the measured engine data 26 from the sensors 18, and predicted engine data 54 from the modeling module 34. The comparator 30 also provides prediction error data 56 to the estimator 32. The estimator 32 provides the model parameter data 42 to the modeling module 34.

Referring again to FIG. 3, the model-based control module 36 includes hardware (e.g., a processor, analog and/or digital circuitry, etc.) and/or software configured to generate the effector equation data 52 using a model-based control algorithm ("control algorithm"). The control algorithm includes one or more model parameters and one or more model terms. The term "model parameter" is used herein to refer to a numerical value (e.g., −5, 3/16, 8.7, etc.) that represents, for example, an engine state, engine efficiency (or inefficiency), modeling error, environmental condition (e.g., temperature, pressure, etc.), engine condition, engine damage, or a net effects of these on other signals. The term "model term", in contrast, is used herein to refer to a mathematical equations (e.g., $dx/dt=2x$, $y=5x+8x^2$, etc.) used to model the dynamics of the engine state, and its effect on a variety of signals associated with the goals and limits, including effects of engine damage, nominal and off-nominal operating conditions, etc. . . .

The control algorithm is operable to generate the effector equation data 52 by processing the goals 21 and limits 22 using the model parameters and model terms. The effector equation data 52 is indicative of one or more equality equations (or goal equations), and one or more inequality equations (or limit equations). The control algorithm generates each goal equation for a respective one of the goals 21 and each inequality equation for a respective one of the limits 22 as a function of the model parameters and the model terms. An example of a goal equation is:

$$B_{goal} \times u = K_{goal} \qquad \text{(goal equation)}$$

where $B_{goal}$ is a matrix whose rows correspond to the goals 21, u is an effector signal value, and $K_{goal}$ is a processed goal vector. An example of a limit equation is:

$$B_{limit} \times u < K_{limit} \qquad \text{(limit equation)}$$

where $B_{limit}$ is a matrix whose rows correspond to the limits 22, and $K_{limit}$ is a limit processed vector.

The goal and the limit equations can be generated using, for example, 1-step Model Prediction Control such as Dynamic Inversion, Backstepping, or Feedback Linearization, or N-step Model Predictive Control. Examples of such control algorithms are disclosed in U.S. patent application Ser. No. 12/115,570, U.S. patent application Ser. No. 12/115,574, U.S. patent application Ser. No. 12/169,183, and U.S. patent application Ser. No. 12/475,020, which are all hereby incorporated by reference in their entirety. The present invention, however, is not limited to any particular method of generating equations relating effector settings to goal tracking and limit holding. One or more of the model parameters and/or model terms can be provided by a memory storage device (not shown) or by the model parameter data 42 and/or model term data 48. In some embodiments, the hardware and/or software of the model-based control module 36 is further configured to modify the goals 21, limits 22, model parameters and/or model terms using the supervisor command data 50.

The optimization module 38 includes hardware (e.g., a processor, analog and/or digital circuitry, etc.) and/or software configured to generate the effector signals 24 using, for example, a constrained optimization algorithm ("optimization algorithm"). The optimization algorithm is operable to generate the effector signals 24 by processing the effector equation data 52 (i.e., the goal and limit equations). More particularly, the optimization algorithm is operable to generate the effector signals 24 by solving the goal and the limit equations for optimal results. "Optimal results" are achieved when, for example, a value is obtained for each effector signal that is "as close as possible" to the solution of the respective goal equation, without violating any of the enabled limit inequality equations. The goal and limit equations, as indicated above, are determined by the model-based control module 36 such that the goals 21 are tracked with acceptable dynamics and that the limits 22 are not exceeded or abruptly met. Examples of suitable optimization algorithms are disclosed in the afore-referenced U.S. patent application Ser. Nos. 12/115,570, 12/115,574, 12/169,183, and 12/475,020. Additional examples of suitable optimization algorithms include linear programming, quadratic programming, interior point methods and nonlinear programming. In some embodiments, the hardware and/or software of the optimization module 38 is further configured to modify the optimization algorithm or the parameters thereof using the supervisor command data 50.

The supervisor module 40 includes hardware and/or software (e.g., a user interface, high level controller, etc.) configured to generate the supervisor command data 50. The supervisor command data 50 can include data for setting relative weights for one or more of the goals 21 (also known as a "relative priority"), data for enabling the limits 22 pertinent to current operation, data for indicating which actuators 17 are currently operational, data for modifying one or more of the goals 21 and/or limits 22, and/or data for modifying the control and/or optimization algorithms. In some embodiments, the supervisor module 40 further includes and/or interacts with one or more fault detection and isolation functions for modifying the aforementioned signals. The signals are modified, for example, by including data for setting thresholds for fault detection, for fault identification and/or for fault isolation in the supervisor command data 50. An example of a suitable engine deterioration detection scheme is disclosed in U.S. Pat. No. 7,415,328, which is hereby incorporated by reference in its entirety.

The comparator 30 includes hardware and/or software configured to generate the prediction error data 56 by determining one or more differences between the predicted engine data 54 and the measured engine data 26. In the embodiment shown in FIG. 2, for example, the comparator 30 is configured as a subtractor. The present invention, however, is not limited to the aforesaid example. For example, the comparator 30 can further include one or more filters to emphasize certain frequency ranges of the prediction error.

The estimator 32 includes hardware and/or software configured to generate the model parameter data 42 as a function of the prediction error data 56. The model parameter data 42, as will be described below in further detail, is generated to at least partially compensate the control system 14 for differences between the predicted engine data 54 and the measured engine data 26. Suitable hardware and/or software for generating the model parameter data 42 includes, for example, a Kalman filter, a neural network, optimal estimation, recursive system identification, asymptotic observer, an adaptive logic of L1 adaptive control theory, etc. . . . Referring to the embodiment shown in FIG. 4, the estimator 32 can also be adapted to generate filtered model parameter data 58 by passing the model parameter data 42 through, for example, a low pass filter 60.

Referring again to FIG. 2, the modeling module 34 includes hardware (e.g., a processor, analog and/or digital circuitry, etc.) and/or software configured to generate the predicted engine data 54 and the model teen data 48 using an on-board model. The on-board model includes a plurality of model terms used for modeling various engine components, systems, etc. The model terms are compiled to collectively model system dynamics of the engine for a wide range of environments and engine states. The on-board model is operable to generate the predicted engine data 54 by processing the model terms as a function of the effector signals and a plurality of model parameters. The on-board model is further operable to generate the model term data 48 by providing, for example, one or more terms of the equations used to make the afore-referenced predictions. Suitable examples of empirical and/or physics-based on-board models are disclosed in U.S. Pat. No. 7,216,071, U.S. Pat. No. 7,277,838, U.S. Pat. No. 7,472,100, U.S. patent application Ser. No. 12/552,656, and U.S. patent application Ser. No. 12/475,038, which are all hereby incorporated by reference in their entirety. One or more of the model parameters can be provided by the memory storage device (not shown) or by the model parameter data 42. In some embodiments, the hardware and/or software of the modeling module 34 can also be configured to generate output variables with associated limits and goals, diagnostic data, redundancy management data, and fault detection data.

A key aspect of the present invention is that the control system 14 can operate in the same manner during both nominal and off-nominal operation. The control system 14, in other words, can operate independent of a fault detection function. Nominal and off-nominal engine operation, nevertheless, will be described separately below for explanatory purposes.

Nominal Engine Operation

Figure 5A:
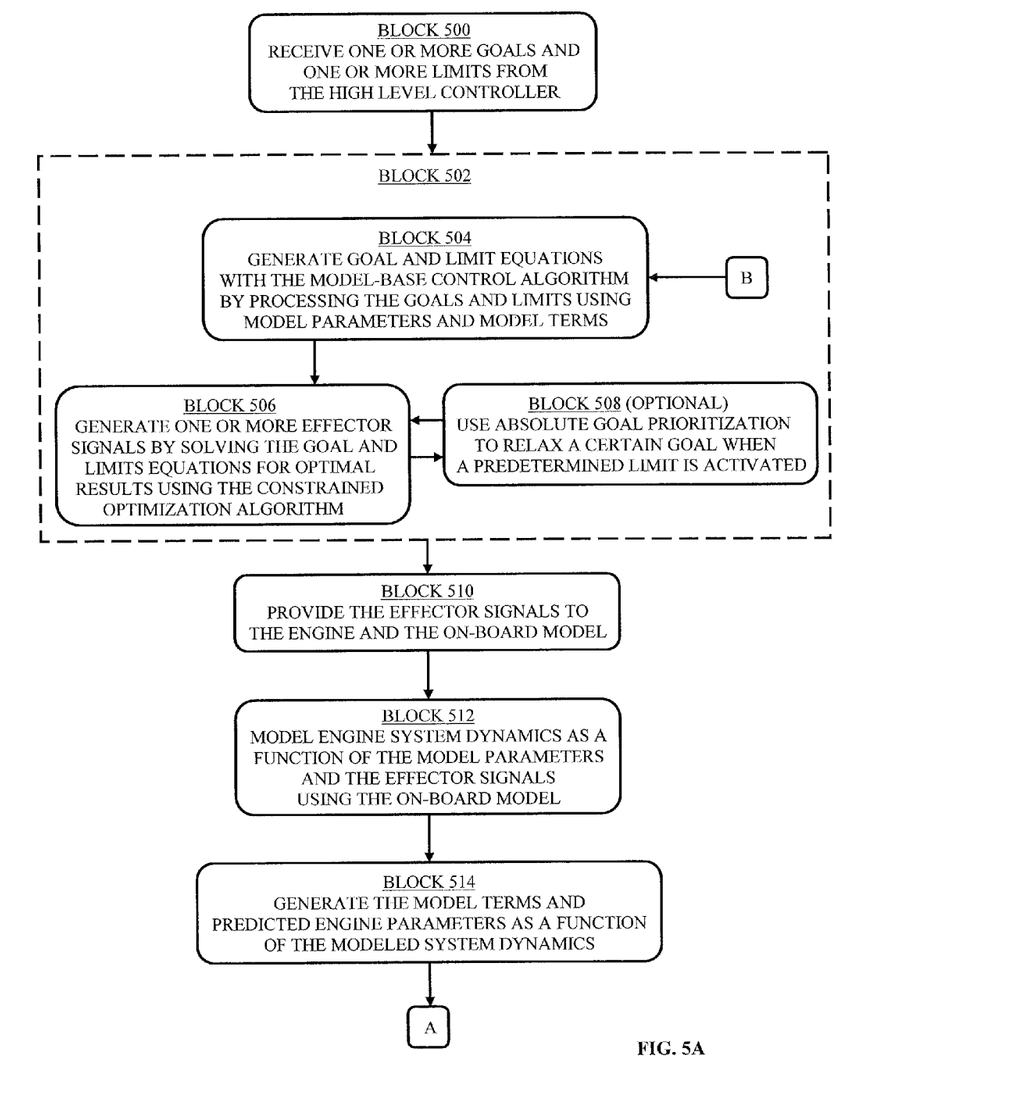
FIGS. 5A and 5B collectively illustrate a detailed flow diagram of the method for adaptively controlling the gas turbine engine.

Referring to FIGS. 2, 3, 5A and 5B, during a first mode of operation (e.g., when the engine 16 is operating under nominal conditions), the control module 28 is prompted to generate effector signals 24 in response to receiving the goals 21 and limits 22 from the high level controller 12 (see block 500 in FIG. 5A). The control module 28 generates the effector signals 24 using the control algorithm and the optimization algorithm (see block 502 in FIG. 5A). The effector signals, as indicated above, are generated in order to control the operation of the engine 16 through the engine actuators 17.

The control algorithm includes, as indicated above, one or more model parameters and one or more model teems. The model parameters are initially set to predetermined parameter values received from the memory storage device (not shown). The predetermined parameter values represent, for example, operating parameters of a fully functional engine under nominal conditions. The model terms are initially set to predetermined terms that model, for example, operation of a fully functional engine under nominal conditions. In this example, the model terms included in the control algorithm that model off-nominal engine operation can be zeroed out by setting corresponding model parameter values to zero. One or more of the predetermined model parameter values and/or terms, however, can be replaced (updated) with model parameters received from the estimator 32 via the model parameter data 42 and/or model terms received from the modeling module 34 via the model term data 48.

The control algorithm generates the effector equation data 52 by processing the goals 21 and limits 22 using the model parameters and model terms (see block 504 in FIG. 5A). The effector equation data includes, as indicated above, data indicative of a goal equality equation for each goal, and data indicative of a limit inequality equation for each limit. The goal and limit equations can be generated using 1-step Model Prediction Control such as Dynamic Inversion or Feedback Linearization, or N-step Model Predictive Control. In some embodiments, the supervisor command data 50 is used to modify and/or to enable or disable one or more of the goals 21 and/or limits 22 prior to the generation of the goal and limit equations.

The optimization algorithm generates the effector signals 24 by solving the goal and limit equations for 'optimal' results (see block 506 in FIG. 5A). Optimal results are achieved when, as indicated above, a value is obtained for each effector signal that is "as close as possible" to solving the respective goal equality equation, without violating the limit inequality equations. Performance index weights ("weights"), from the supervisor command data 50, can be used to define what is "as close as possible" for each goal. A weight of "4", for example, for an equation related to a goal indicates errors in satisfying the goal equation are twice as important as another goal equation error that has a weight of "2". The supervisor therefore can change the relative priority of the goals by adjusting the weights. A weight of "0", for example, effectively turns a goal off since errors associated with the goal equation are relatively inconsequential.

In some embodiments, the optimization algorithm uses Absolute Goal Prioritization to relax (i.e., reduce or eliminate) a certain goal when, for example, a predetermined limit has been activated (i.e., is being used) (see block 508 in FIG. 5A). The goal prioritization is used such that the mathematical sign of the effector signal values do not negatively influence the remaining non-relaxed goals or active limits. The goal prioritization is further used to ensure that the model equations are suitable for use in the model-based control module 36. In some embodiments, for example, the model-based control module 36 may not permit non-minimum phase responses. More generally, the goal prioritization can be used to ensure the provision of a stable control system 14.

The control module 28 provides the effector signals 24 to the engine 16 and to the modeling module 34 (see block 510 in FIG. 5A).

The modeling module 34 generates the predicted engine data 54 and the model term data 48 using the on-board model. The on-board model includes, as indicated above, a plurality of model terms that model a plurality of various engine component/system functions and states. The model parameters within one or more of the model terms are initially set to predetermined parameter values received from the memory storage device (not shown). The predetermined parameter values are selected as a function of the effector signals 24 generated by the control module 28 and, therefore, the goals 21 and limits 22. In particular, the predetermined parameter values which are selected represent an engine state that corresponds to the engine state being induced by the effector signals 24. One or more of the predetermined model parameter values, however, can be replaced (updated) with model parameters received from the estimator 32 via the model parameter data 42.

The model terms are activated (i.e., used during the modeling) or deactivated (i.e., not used during the modeling) as a function of the model parameters and/or the effector signals 24. In one embodiment, for example, the model terms that account for off-nominal operation are continuously estimated, whether or not there is any detection of off-nominal conditions. When operation is nominal, the estimated model terms will be relatively small, so as to have little, if any, effect on the control system 14. When operation is off-nominal, the estimated model terms, modeling abnormal environments, engine faults, engine damage, etc., will become larger, without the need for explicit detection of off-nominal conditions. The control system 14, therefore, can accommodate off-nominal operation quicker than if the off-nominal operation first needs to be detected. Optionally, some or all of the model terms that account for off-nominal operation can be deactivated by zeroing out its model parameters such that the on-board model, for example, does not model off-nominal parameters during nominal operation. Additionally, the model terms can be modified as a function of the model parameter data 42 to at least partially compensate for differences between the predicted engine data 54 and the measured engine data 26. The modified terms can then be provided to the model-based control module 36 via the model term data 48 to update the control algorithm.

The on-board model generates the predicted engine data 54 and the model term data 48 by modeling the system dynamics of the engine 16 with the model terms as a function of the effector signals 24 and the model parameters (see blocks 512 and 514 in FIG. 5A). The predicted engine data 54 is indicative of predicted values for engine parameters such as temperature, pressure, etc. that are monitored by the sensors 18. The modeling module 34 provides the generated predicted engine data 54 to the comparator 30 (see block 516 in FIG. 5B). The modeling module 34 also provides the model term data 48 to the model-based control module 36 (see block 516 in FIG. 5B).

Figure 5B:
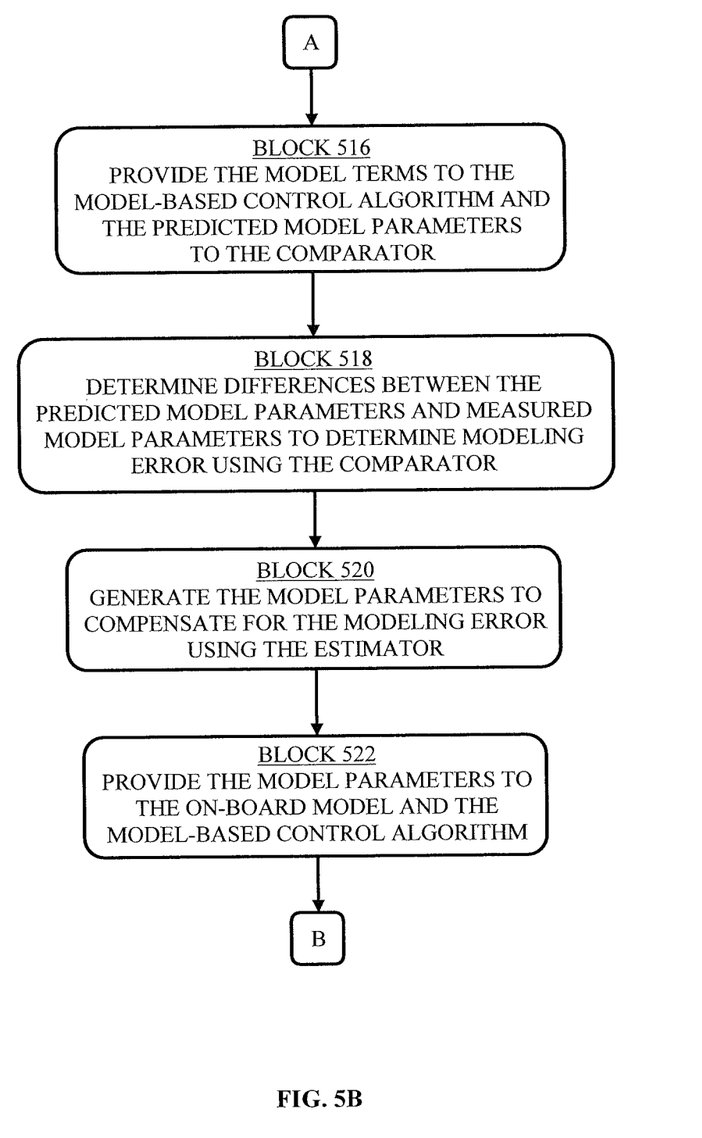

The comparator 30 determines the differences (i.e., discrepancies) between the predicted engine data 54 and the measured engine data 26 (see block 518 in FIG. 5B). The comparator 30, for example, may determine the difference between an engine temperature predicted by the on-board model and a respective engine temperature measured by the sensors 18. The comparator 30 generates the prediction error data 56 which is indicative of the determined differences.

The estimator 32 generates the model parameter data 42 as a function of the prediction error data 56 (see block 520 in FIG. 5B). The model parameter data 42 is generated to at least partially compensate the on-board model for errors in its prediction. The model parameter data 42, in other words, is generated to at least partially compensate the on-board model for the collective differences between the predicted engine data 54 and the measured engine data 26. The generated model parameter data 42 is provided to the modeling module 34, and to the model-base control module (see block 522 in FIG. 5B). In this manner, the model parameters in the on-board model and in the model-based control algorithm are modified for each modeling error, independent of its relative value as compared to a threshold.

Figure 4:
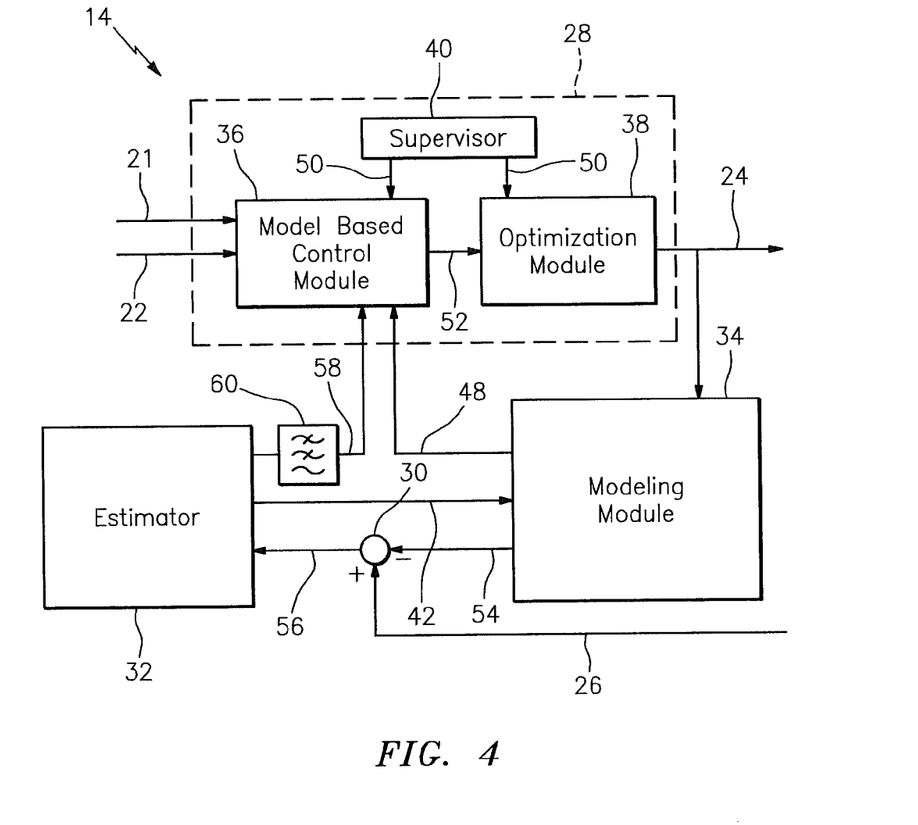
FIG. 4 is a schematic diagram of another embodiment of the adaptive control system shown in FIG. 2.

In the embodiment shown in FIG. 4, the model parameter data 42 provided to the modeling module 34 has a relatively high bandwidth such that the on-board model quickly adapts to compensate modeling errors. In one embodiment, for example, the model parameter data 42 can be generated to fully compensate for the modeling error. The model parameter data 42 provided to the model-base control module, in contrast, has a relatively low bandwidth to promote system stability; i.e., prevent over compensation in the effector signals 24. The bandwidth of the model parameter data 42 provided to the model-base control module is reduced using the low pass filter 60, which may be designed using L1 adaptive control theory.

Off-Nominal Engine Operation

Referring again to FIGS. 2 and 3, during a second mode of operation (e.g., when the engine 16 is operating under off-nominal conditions), the model parameter data 42 generated by the estimator 32 can further include one or more model parameters that represent abnormal environmental conditions, engine damage, engine inefficiencies, etc. . . . In addition, one or more of the model terms of the on-board model is designed to model the abnormal environmental conditions, engine damage, engine inefficiencies, etc. If a designer elects to include alternate logic operations in off-nominal conditions, fault detection and isolation logic can be used to determine when the alternate logic should be engaged. The following describes an embodiment that uses fault detection and fault identification.

One of the model parameters generated by the estimator 32 can represent, for example, a flow rate of airflow escaping through a leak (e.g., a hole, fracture, crack, etc.) in a gas flow path wall of the engine 16. The flow rate of the escaping airflow can be estimated, for example, as a function of the difference between a flow rate predicted by the on-board model and a flow rate measured by one of the sensors 18. The estimated flow rate can then be included as one of the model parameters provided to the modeling module 34 and to the model-base control module. In other embodiments of the invention, however, the air flow rate can be continuously estimated in the same manner for both nominal and off-nominal conditions. During nominal operation, for example, the estimated air flow would be relatively small so as to have little, if any, effect on the control system 14. During off-nominal operation, in contrast, the estimated airflow rate would be significantly larger so as to influence the control system 14. Changing the estimated parameters or the manner of estimation in the event of a detected fault can be valuable, for example, to resolve ambiguities in the prediction errors 56 or to make used of additional external information that may be provided.

Referring again to the embodiment that includes fault detection and identification, the modeling module 34 updates its model parameters using the model parameters data, which includes the estimated flow rate. A model term for modeling a damaged flow path is activated by updating a zeroed out model parameter with the estimated flow rate. The activated model term can then be included as one of the model terms provided to the model-base control module. In addition, the on-board model can model the system dynamics of the engine 16 while accounting for the damaged flow path using the activated model term.

The model-based control module 36 updates its model parameters and model terms using the model parameter data 42, which includes the estimated flow rate, and the model term data 48, which includes the activated model term. The control algorithm can then generate the effector equation data 52 while accounting for the damaged flow path. The effector signals 24 generated by the optimization algorithm therefore also account for the damaged flow path. In some embodiments, one or more of the limits 22 can also be increased (if the limit is a maximum) or reduced (if the limit is a minimum) by the supervisor command data 50, for example, in order to provide additional thrust during an emergency (e.g., when there is catastrophic aircraft or engine damage, etc.). In another embodiment, the limits 22 can be increased in response to detected engine damage, for example, so as to ensure a safe landing. In both of the aforementioned embodiments, the remaining life of the engine is sacrificed in the interest of flight safety.

The second mode of operation has been described as identifying the source (i.e., the leak in the gas flow path wall of the engine) of the off-nominal operating condition for clarity. During the second mode, however, the off-nominal model parameter and model term need not particularly identify the source of the off-nominal operating condition. The off-nominal model parameter, for example, can be a generic parameter that is used to compensate for the differences in flow rate determined by the comparator 30. Similarly, the off-nominal model term can be a generic term that models a reduced flow rate in the gas flow path of the engine. The off-nominal conditions can be accommodated in a fast reactive mode, independent of fault detection, and in one or more layers of slower reflective modes that use an evolving understanding of the nature of the off-nominal condition.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A method for adaptively controlling a gas turbine engine, comprising:
    generating model parameter data as a function of prediction error data, which model parameter data includes at least one model parameter that accounts for off-nominal operation of the engine and at least one model parameter that accounts for nominal operation of the engine, wherein the engine is configured for an airplane propulsion system;
    at least partially compensating an on-board model for the prediction error data using the model parameter data;
    generating model term data using the on-board model, wherein the on-board model includes at least one model term that accounts for the off-nominal operation of the engine, the model term comprises a mathematical equation, and the model term data comprises one or more terms of the mathematical equation;
    respectively updating one or more model parameters and one or more model terms of a model-based control algorithm with the model parameter data and model term data; and
    generating one or more effector signals using the model-based control algorithm.

2. The method of claim 1, further comprising:
    providing a processor adapted with at least one of the on-board model and the model-based control algorithm; and providing the one or more effector signals to one or more engine actuators.

3. The method of claim 1, wherein the off-nominal operation of the engine is indicative of at least one of an abnormal environmental condition in which the airplane propulsion system is operating and engine damage.

4. The method of claim 1, further comprising:
generating predicted engine data using the on-board model, which prediction engine data is indicative of modeled system dynamics of the engine; and
comparing measured engine data and the predicted engine data to generate the prediction error data.

5. The method of claim 1, further comprising controlling the engine with the effector signals.

6. The method of claim 1, wherein the generating of the one or more effector signals comprises:
receiving one or more goals and one or more limits; and
generating effector equation data using the model-based control algorithm, which effector equation data is indicative of one or more goal equality equations and one or more limit inequality equations.

7. The method of claim 6, wherein the generating of the one or more effector signals further comprises optimizing the effector equation data to generate the effector signals.

8. The method of claim 7, wherein the effector equation data is optimized using a constrained optimization algorithm.

9. The method of claim 7, wherein the optimizing of the effector equation data further comprises using absolute goal prioritization to weight one or more of the goals.

10. The method of claim 1, wherein the model-base control algorithm comprises one of a 1-step Model Predictive Control and an N-step Model Predictive Control, and wherein the 1-step Model Predictive Control is designed using one of dynamic inversion, backstepping, and feedback linearization.

11. The method of claim 1, further comprising filtering the model parameter data that updates the one or more model parameters of the model-based control algorithm with a low pass filter.

12. The method of claim 1, wherein the model parameter comprises a numerical value.

13. The method of claim 1, wherein the generating of the model parameter data is independent of a fault detection functionality, and the method is operable to operate in a same manner during both the nominal and the off-nominal operation of the engine of the airplane propulsion system.

14. An adaptive control system, comprising:
an airplane propulsion system including a gas turbine engine;
a control module adapted to generate one or more effector signals using a model-based control algorithm in response to receiving one or more control signals, and to respectively update at least one model parameter and at least one model term of the model-based control algorithm using model parameter data and model term data;
an estimator adapted to generate the model parameter data as a function of prediction error data, wherein the model parameter data includes at least one model parameter that accounts for off-nominal operation of the engine of the airplane propulsion system and at least one model parameter that accounts for nominal operation of the engine of the airplane propulsion system; and
a modeling module adapted to generate the model term data using an on-board model, and to update the on-board model with the model parameter data to at least partially compensate for the prediction error data, wherein the on-board model includes at least one model term that accounts for off-nominal operation of the engine, the model term comprises a mathematical equation, and the model term data comprises one or more terms of the mathematical equation.

15. The system of claim 14, wherein the estimator is adapted to generate the model parameter data independent of a fault detection functionality, and the control system is operable to operate in a same manner during both the nominal and the off-nominal operation of the engine of the airplane propulsion system.

16. The system of claim 14, further comprising a comparator adapted to provide the prediction error data by comparing measured engine data to predicted engine data.

17. The system of claim 14, wherein the control algorithm is further adapted to optimize goal and limit equations generated by the model-based control algorithm using a constrained optimization algorithm to generate the effector signals.

18. The system of claim 14, wherein the modeling module is further adapted to update the on-board model using the effector signals.

19. The system of claim 14, further comprising a supervisor module that provides supervisor command data to the control module for modifying at least one of the control signals, the model parameters, the model terms and the model-based control algorithm.

20. The system of claim 14, wherein the estimator comprises a Kalman filter.

21. The system of claim 14, wherein the estimator is based on one of a recursive system identification, an optimal estimation, an asymptotic observer and a L1 adaptive control.

22. The system of claim 14, wherein the estimator includes a filter for filtering the model parameter data provided to the control module.

23. The system of claim 14, wherein the model parameter comprises a numerical value.

* * * * *